United States Patent [19]

Kramer et al.

[11] Patent Number: 4,569,293

[45] Date of Patent: Feb. 11, 1986

[54] FREIGHT CAR CONSTRUCTION

[75] Inventors: Rolf Kramer; Günter Ahlborn, both of Siegen; Felix Schneider; Ernst Neuser, both of Netphen; Henry Hübsch, Siegen; Gerhard Kampmann; Paul-Werner Wagener, both of Netphen, all of Fed. Rep. of Germany

[73] Assignee: Waggon Union GmbH, Fed. Rep. of Germany

[21] Appl. No.: 595,332

[22] Filed: Mar. 30, 1984

[30] Foreign Application Priority Data

Apr. 2, 1983 [DE] Fed. Rep. of Germany ....... 3312001

[51] Int. Cl.[4] .............................................. B61D 39/00
[52] U.S. Cl. ........................................ 105/377; 52/55
[58] Field of Search ................... 105/377, 378; 52/55; 49/128, 130

[56] References Cited

U.S. PATENT DOCUMENTS

| 1,258,314 | 3/1918 | Bruce | 105/377 |
| 2,201,737 | 5/1940 | Meyer et al. | 105/377 |
| 3,520,257 | 7/1970 | James | 105/377 |
| 3,526,194 | 9/1970 | Schneider et al. | 105/377 |
| 4,341,163 | 7/1982 | Ritzl | 105/377 |

FOREIGN PATENT DOCUMENTS 2832353 2/1980 Fed. Rep. of Germany ...... 105/377

Primary Examiner—Louis J. Casaregola
Attorney, Agent, or Firm—McGlew and Tuttle

[57] ABSTRACT

A freight car is constructed with an undercarriage having a flat cargo floor and with an upright fixed end wall at each end of the floor. A gantry in the form of an arch extends upwardly from the floor substantially centrally between the end walls and a hood support rail extends between the fixed end walls on each side of the floor. The space above the floor is covered by a hood which is of a length to extend between the gantry and one end wall and which includes a roof portion which overlies the gantry and the one end wall and side wall portions which extend downwardly from each side of the roof. The side wall portions carry rollers or casters which are engageable with the rail for supporting the hood for movement along the rail. The hood may be moved when it is in an open position along the rail for example to completely uncover the space between the gantry and one end wall. Two hoods are advantageously employed, each of which is movable along the rail when they are positioned in an opened position but only alternatively. When they are in a closed position an actuator lifts the side wall of the hood upwardly to move the casters off the rail and to move the side wall inwardly toward the edge of the floor into a closed position.

8 Claims, 10 Drawing Figures

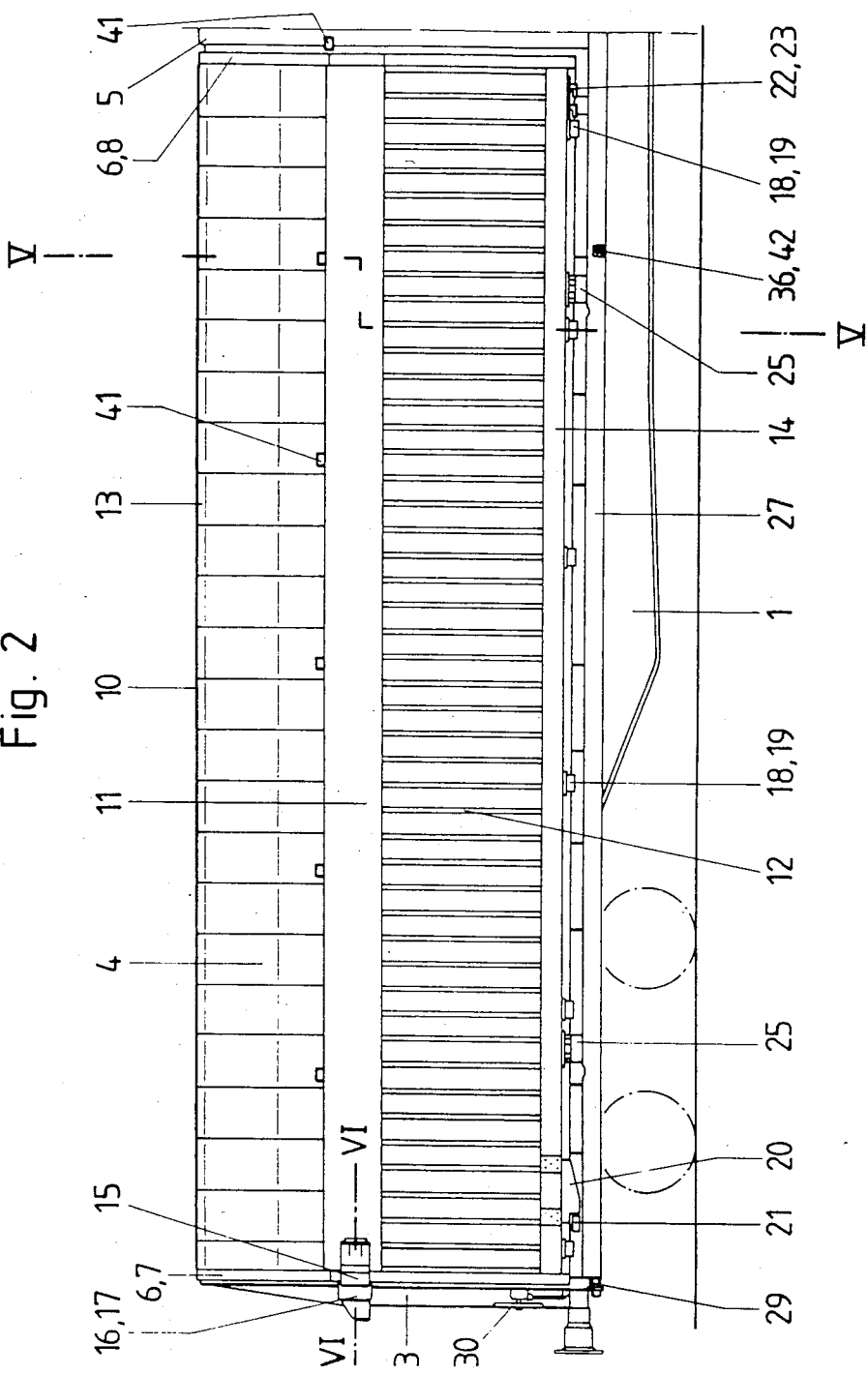

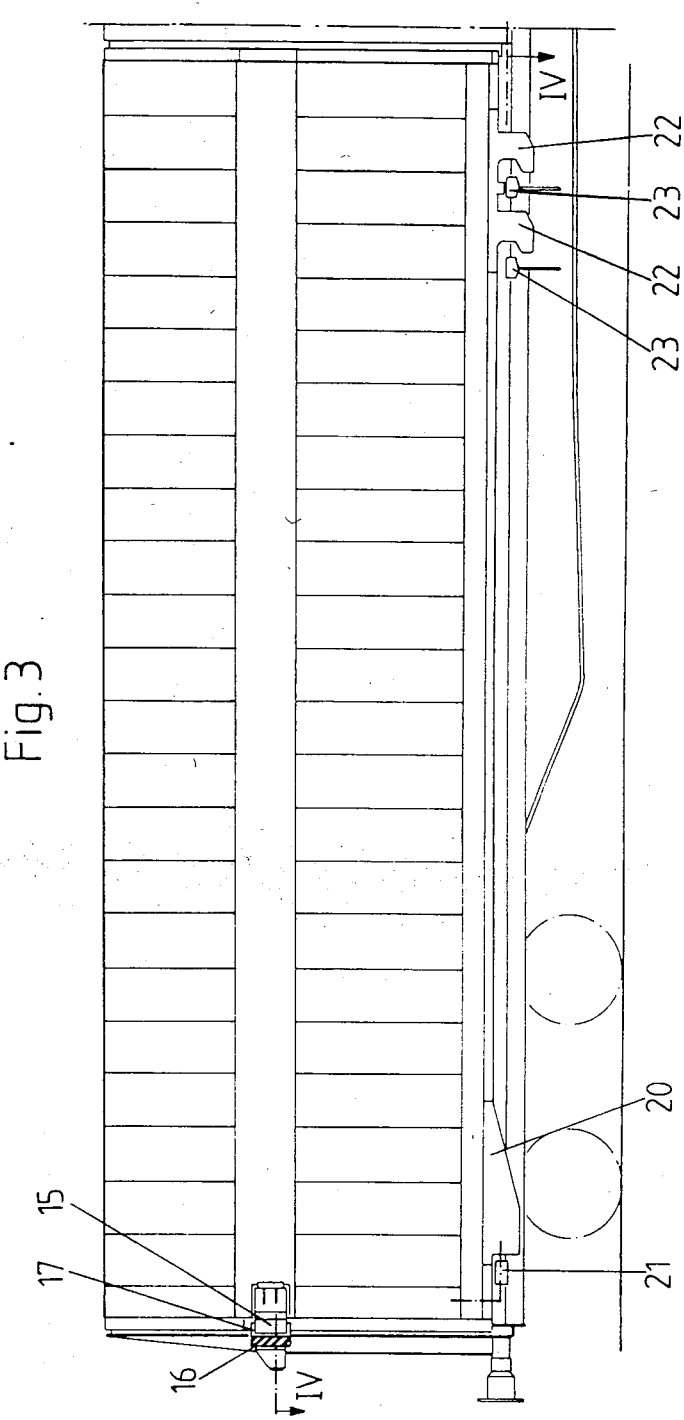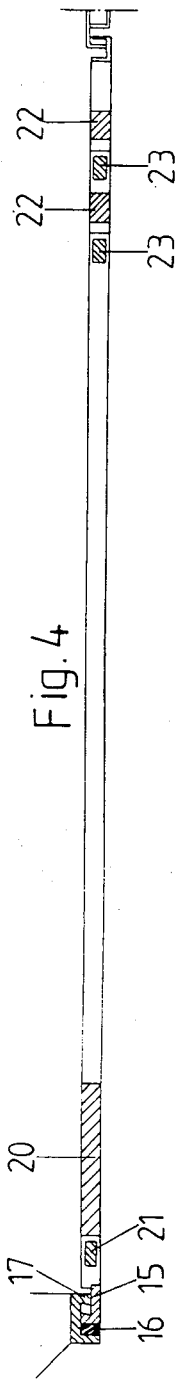

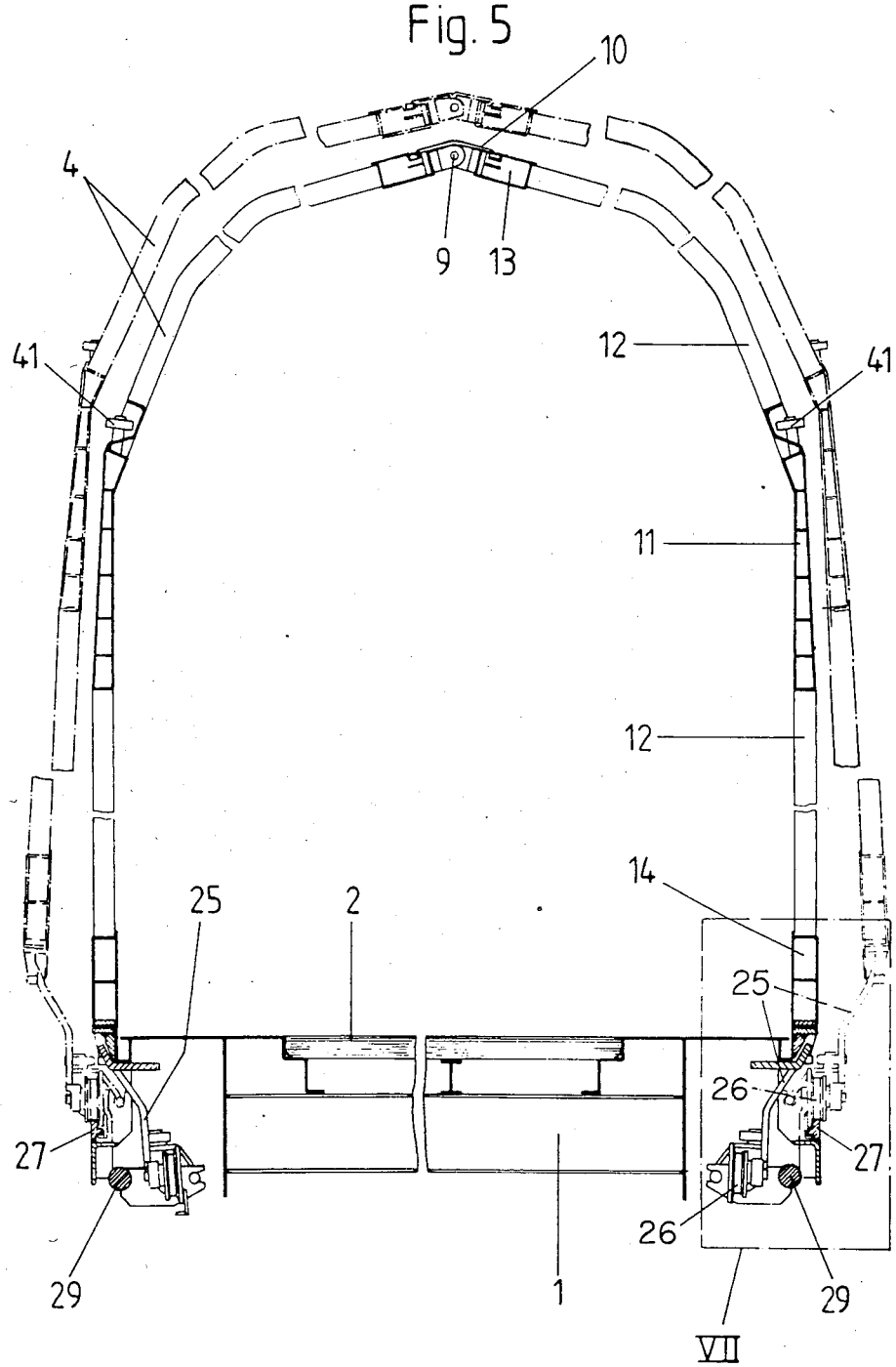

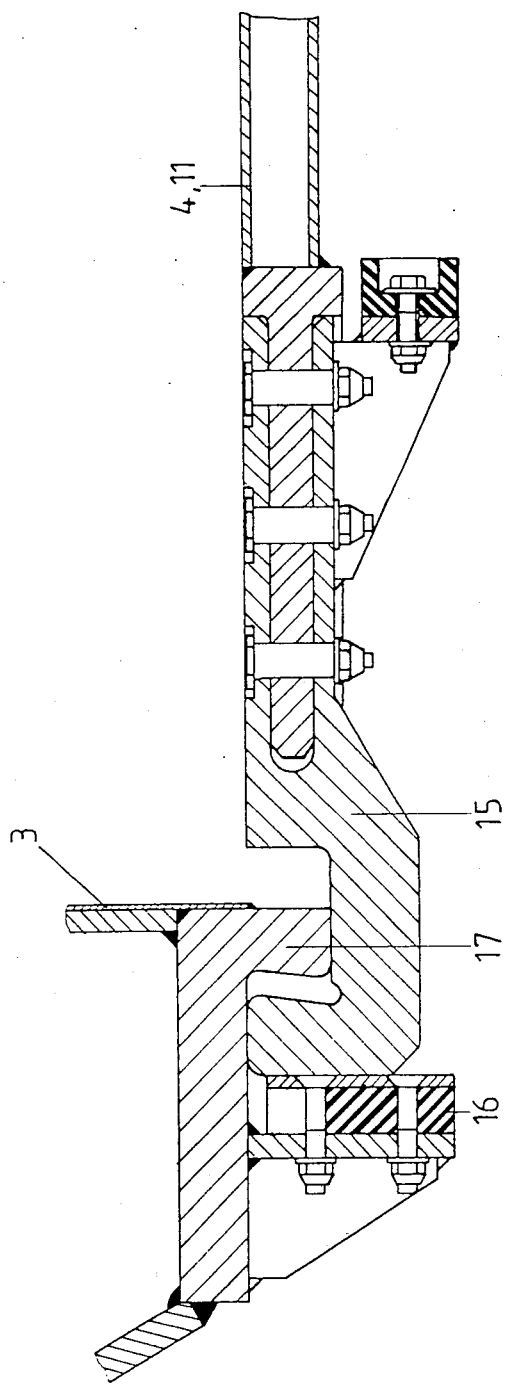

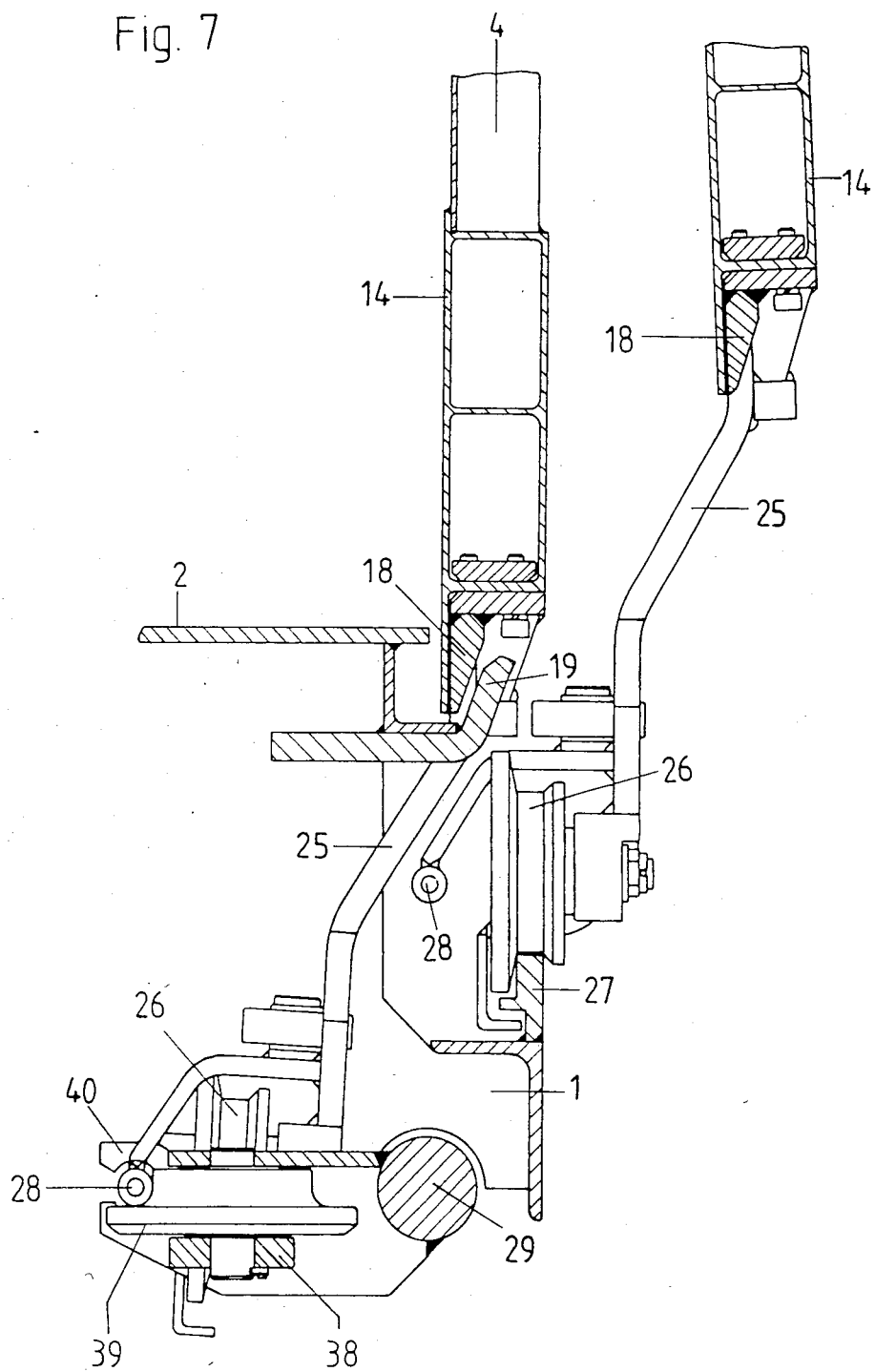

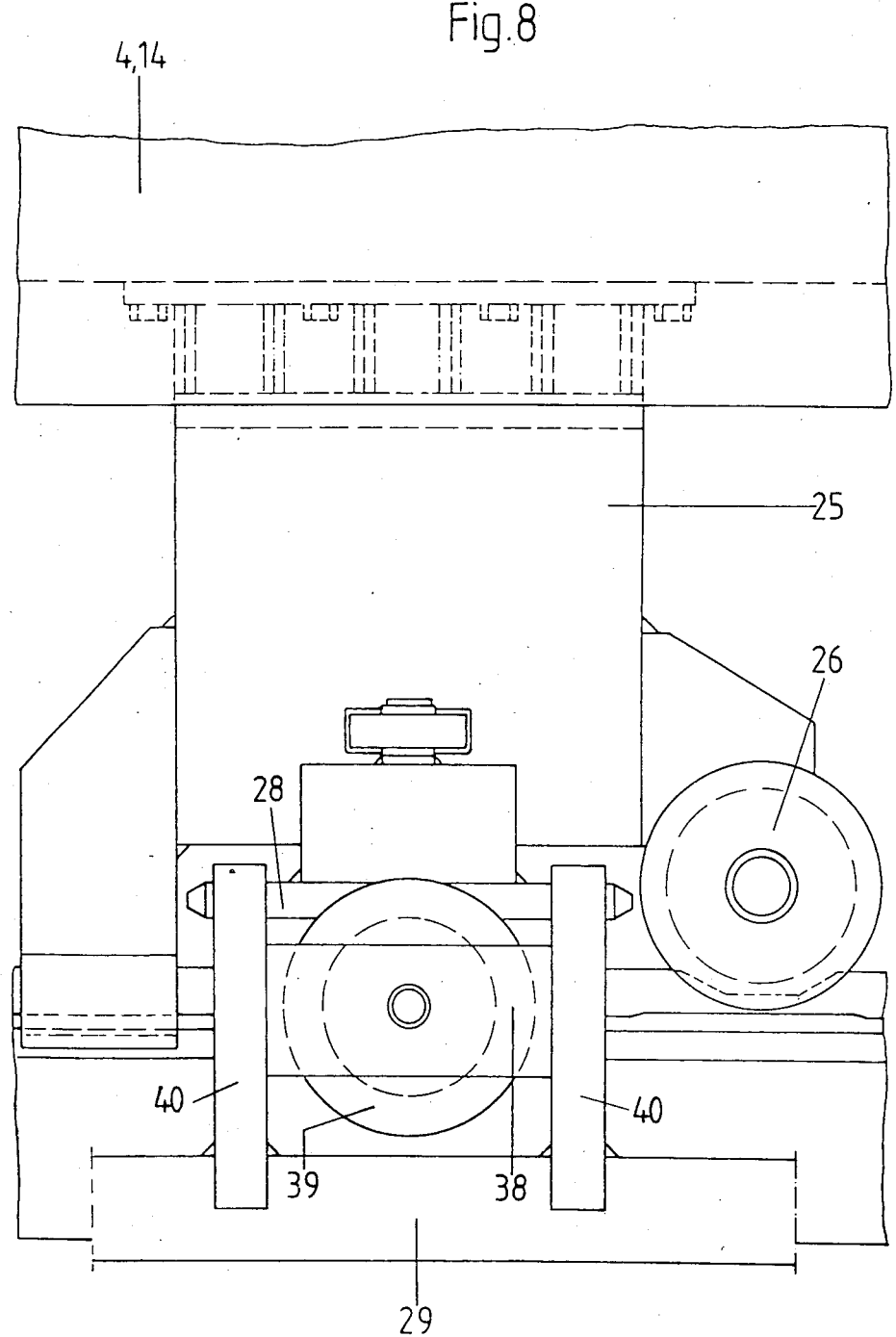

FREIGHT CAR CONSTRUCTION

FIELD AND BACKGROUND OF THE INVENTION

This invention relates in general to the construction of rail vehicles and in particular to a new and useful freight car which includes a gantry arranged between two upright end walls over a floor and a closure hood which is engageable over the gantry and one end wall and may be slid along the rails.

The invention relates particularly to a freight car with end walls and a fixed central gantry, a substantially flat bottom and hold covering hoods which in the closed position lie on one plane and slide one over the other through rollers running on rails, which hoods are divided at the top, are provided with joints and an elastic covering, and can be raised and pivoted by means of an actuating system for displacement from their closed position into a sliding position.

Freight cars are known where the loading area is covered by gantry type hoods slidable one into the other in telescope fashion. These freight cars, the loading area of which can be cleared by sections for easy access from the sides and from above, serve predominantly for transport of heavy freight (e.g. large rolls of sheet metal) which is secured on the loading area. Such cars are less suitable for transporting mixed cargo, as it may become difficult to open the hoods if the freight shifts. Also there is the disadvantage that in view of the sliding of the smallest hood the entire loading space is restricted in accordance with the dimensions of this hood.

Further, freight cars with fixed end walls are known whose loading area is covered with hoods sliding on rollers, at least one of the hoods having wall and roof sections which can be released so as to be able to push one hood over another hood in longitudinal direction of the vehicle body. According to DT-PS No. 923,669, for example, a closed vehicle body of the above described kind is known. In such a vehicle body, a superstructure covering the loading area comprises at least two hoods aligned side by side in closing position, which hoods are supported by means of rollers and can be telescoped for easier loading and unloading in such a way that, depending on the sliding direction of these hoods, the left or the right half of the loading area can be cleared entirely. The hoods of this known design are divided lengthwise at the top, the two halves of each hood being connected together by means of joints. In this known design, separate, parallel rails on which the hoods can slide are provided for the rollers of each hood.

A disadvantage of this known design is, for one thing, the deficient clamp connection of the hoods to the car box in a closed position of the hoods, so that the longitudinal forces deriving from the freight when the car moves must be fully absorbed as transverse forces by the end walls. For another thing, in the design of the hood sliding system it is diadvantageous that several rails are arranged parallel to each other and that at least one hood must be pushed under another hood for opening, so that when cargo applies against a hood, difficulties in opening this hood may arise.

From German OS No. 2 910 799 a rail vehicle with releasable and slidable hoods is further known where the hoods may be designed at the top with a strip of flexible material, around which the two hood halves formed by the provision of the strip can be swiveled relative to each other in a predetermined zone. For the displacement of these hoods at least two support rails for two or more hoods are provided in the nearer zone of a long side of the loading floor in a plane lying under the loading area thereof. To displace the hoods, they are lifted and pivoted out of their closing position by means of an actuating device and are pushed over the hood present in a closing position. To clear the second half of the loading space, now both hoods jointly must be pushed over the first previously opened half of the loading space.

This known design also has the disadvantage of insufficient clamping of the hoods to the vehicle body in a closed position, as well as the complicated design of the actuating system of the individual hoods, which requires several rails on each long side of the car and necessitates in part a displacement of several hoods one over the other. Another disadvantage of this design is that contactless displacement of the hoods is not ensured, because there are no joints.

From EP No. 0 011 195 a freight car is known which has a roof and lateral parts, each containing at least two movable wall portions. These wall portions are arranged, in closed position, in a common plane and are pivotable by means of an actuating system, e.g. rotatably mounted guides, into a sliding plane lying before the common closure plane and are retained in this plane displaceable in a lengthwise direction of the vehicle. The wall portions are connected with roof sections which extend along a wall portion and as a whole form the vehicle roof. The roof sections have a position which permits longitudinal sliding when the wall portions are in a sliding plane.

A disadvantage of this previously described design is the multi-joint system of each hood, involving disadvantages of principle with regard to the slackness of the individual hoods in closed position and when being displaced. For this reason no further comment about this design is made here.

SUMMARY OF THE INVENTION

The invention provides a freight car with a loading space which is covered by means of hoods with an actuating system operable so that the hoods, in closed position, transmit at least partially the longitudinal forces acting on the end walls to the underframe of the freight car. The hood actuating system permits selective sliding of one hood over another, and it is simple and economical, reliable operation being ensured, and that the disadvantages of the above mentioned known designs avoided.

According to the invention, a central gantry is fixed to the underframe and is arranged without bracing. Each hood covers a loading space between an end wall and the central gantry. In closed position, each hood is secured to the end wall form and force lockingly in longitudinal directions. The hood stands on its bottom lengthwise sides near the end wall side lengthwise end with abutment pieces extending in the direction of the end wall with play in front of abutment cams on the frame of the underframe of the freight car. The hood stands near its central gantry side lengthwise end on its bottom lengthwise sides with clasps in the direction of the end wall with play before and under liftoff lock cams of the underframe. Support feet fixed at its bottom lengthwise sides of the hood stand in support rails of the underframe, and that by means of the actuating system the hood is adapted to be lifted out of the closing position with its rollers onto the rails into the sliding position, to be pivoted and set down.

By the arrangement and design of the hoods according to the invention, they can be selectively raised and shifted over the gantry and over the hood which is in a closed position. The space within the clearance profile can be optimally utilized for loading. With the hoods in closed position, automatic clamping of the hoods to the end walls and to the underframe in lengthwise directions of the car takes place. Thereby the load pressure acting on the end walls upon buffer impact is transferred for the most part into the underframe of the freight car via the hoods. The end wall may therefore be of lighter construction and its attachment to the underframe made simpler. In the closed position, the hood stands with its support feet in support rails of the underframe, owing to which the rollers are relieved.

According to the invention, the hood further comprises in the zone where it is clamped to the end wall a continuous longitudinal girder, on which staves extending like ribs to terminal sections on the long sides of each half of the hood are fixed. The arrangement of the longitudinal girder in the hood in the region of its clamping to the end wall permits direct transmission of force from the end wall into a hood supporting member. The staves between the terminal sections of the long sides of each half of the hood and the longitudinal girder ensure direct transmission of the forces from the longitudinal girder via the staves into the abutment piece and abutment cam of the under-frame.

Each support foot and each support rail are provided with matching bevels extending in lengthwise directions of the car, the bevels of the support rail being positioned spaced before the bevels of the support feet when the hoods are in a closed position. The bevels of the support rail and of the support feet ensure a centered introduction of the hood into the closed position and bring about a propping of the lower long sides of the hood if freight applies against the hood from within, without hindering the pivoting of the hood from its closed to its sliding position.

Each hood lies in sliding position before its closed position and in closed position against elastic stops of the end wall. These elastic stops position the hood in its sliding position. before its closed position and ensure the clearance between abutment pieces and abutment cams as well as between clasps and liftoff lock cams after an impact.

Each hood on its outer side in the region of the longitudinal girder and the gantry on its outer side comprise guide rollers rotatable about a vertical axis for the lateral guiding of the shifted hood. During shifting of the hood, due to its triple articulation, contact of the hood to be shifted with the gantry or with the hood in closed position can occur. Contact of the hood to be shifted with the central gantry or with the hood in a closed position is avoided by the guide rollers.

On each long side of the underframe, a single straight and uninterrupted rail extending over the entire car length is arranged, there being fixed at least two rollers on casters at the bottom of each long side of each hood, as known, a short auxiliary rail laterally protruding over the caster being fixed on each caster in lengthwise directions of the car. Advantageously the rollers of the hoods are fixed to the hoods, having no movable joint parts and hence no trouble prone structural parts.

According to the invention, the actuating device for each hood comprises on each long side of the car an actuating shaft mounted rotatably in the underframe in lengthwise direction of the car, the actuating shaft carrying for each caster a fixed support arm, at the free end of which a support roller rotatable in lengthwise direction of the car is arranged which in the closed as well as in the shifting position of the hood and applies from below against the auxiliary rail before the closed position of the hood, the hood being pivotable by means of the actuating shaft via the support arm, support roller and auxiliary rail from the closed position into the shifting position. All movable parts of the actuating system are disposed in the underframe of the railroad car advantageously protected.

According to a form of the invention, at least one safety fork which in closed position of the hood and during the pivoting thereof spans the auxiliary rail, is fixed to the actuating shaft near each support arm. The safety fork secures the hood in a closed position and during pivoting out of its closed position into the shifting position against unintended lifting off of the auxiliary rail from the support roller.

Advantageously the actuating shafts of each hood are connected by a linkage which brings about an opposing rotation of the actuation shafts. Further, according to the invention there is interposed in the actuating system of each hood a relief spring which by the dead weight of the hood is tensionable during pivoting into the closed position of the hood. By the relief spring the lifting and pivoting of the hood is greatly facilitated. Complicated transmission gears with the long movement paths within the actuating system are avoided.

On the whole, the invention makes it possible to completely open the loading space of one half of a freighter, the design of the hood as an integrated structural part of the car box in the closed position thereof having a favorable effect on the structural design thereof and thus making it economical. The hood-actuating system is composed of few, simple and well protected parts, which ensure saft pivoting and shifting of the hood.

A freight car comprising first and second spaced apart end walls, and a fixed central gantry between the end walls, a substantially flat bottom, and hold covering hoods which in the closed position lie in one plane and slide one over the other through rollers running on rails, which hoods being divided at the top and provided with joints, an elastic covering over the joints, actuating means for pivoting the hood joints for displacement from their closed position into a sliding position, the gantry being fixed to the underframe without bracing, each hood covering the loading space between an end wall and the central gantry and in a closed position being clamped to the end wall form and force lockingly at its end wall side lengthwise end, the hoods have lower end abutment pieces extending in the direction of the end wall with play in front of abutment cams on the underframe of the freight car, the hood having bottom lengthwise sides with clasps extending in the direction of the end wall with play before and under liftoff lock cams of the underframe, the hood having support feet fixed at its bottom lengthwise sides to the hood standing in support rails of the underframe, an actuating sysem for lifting the hood out of the closing position with its rollers onto the rails into the sliding position, to be pivoted and set down.

Accordingly it is an object of the present invention to provide a freight car construction which includes an undercarriage including a flat car of a floor with an upright fixed end wall of each end and a gantry extending upwardly from the floor between the end walls which includes a hood support rail extending between the fixed walls and a hood which includes a portion overlying the gantry in one of the end walls and a side wall portion extending downwardly from the roof portion which has caster means which engage with the rail and support the hood for movement along the rail.

A further object of the invention is to provide a freight car construction wherein the freight car includes a hood which may be moved along a rail structure defined on each side of the undercarriage so as to completely open the roof and two side portions of the car when it is moved along the rail.

A further object of the invention is to provide a freight car which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is a side elevational view of one half of the freight car according to FIG. 1, in simplified representation;

FIG. 3 is a view similar to FIG. 2 in schematic representation;

FIG. 4 is a section taken along line V—V of FIG. 2 with one hood in a closed position and one open hood shifted over it, in schematic representation;

FIG. 6 is a partial section taken along line VI—VI of FIG. 2;

FIG. 7 is an enlarged detail of a portion of FIG. 5;

FIG. 8 is a front elevational view of the detail according to FIG. 7;

DESCRIPTION OF THE PREFERRED EMBODIMENTS

Figure 1:
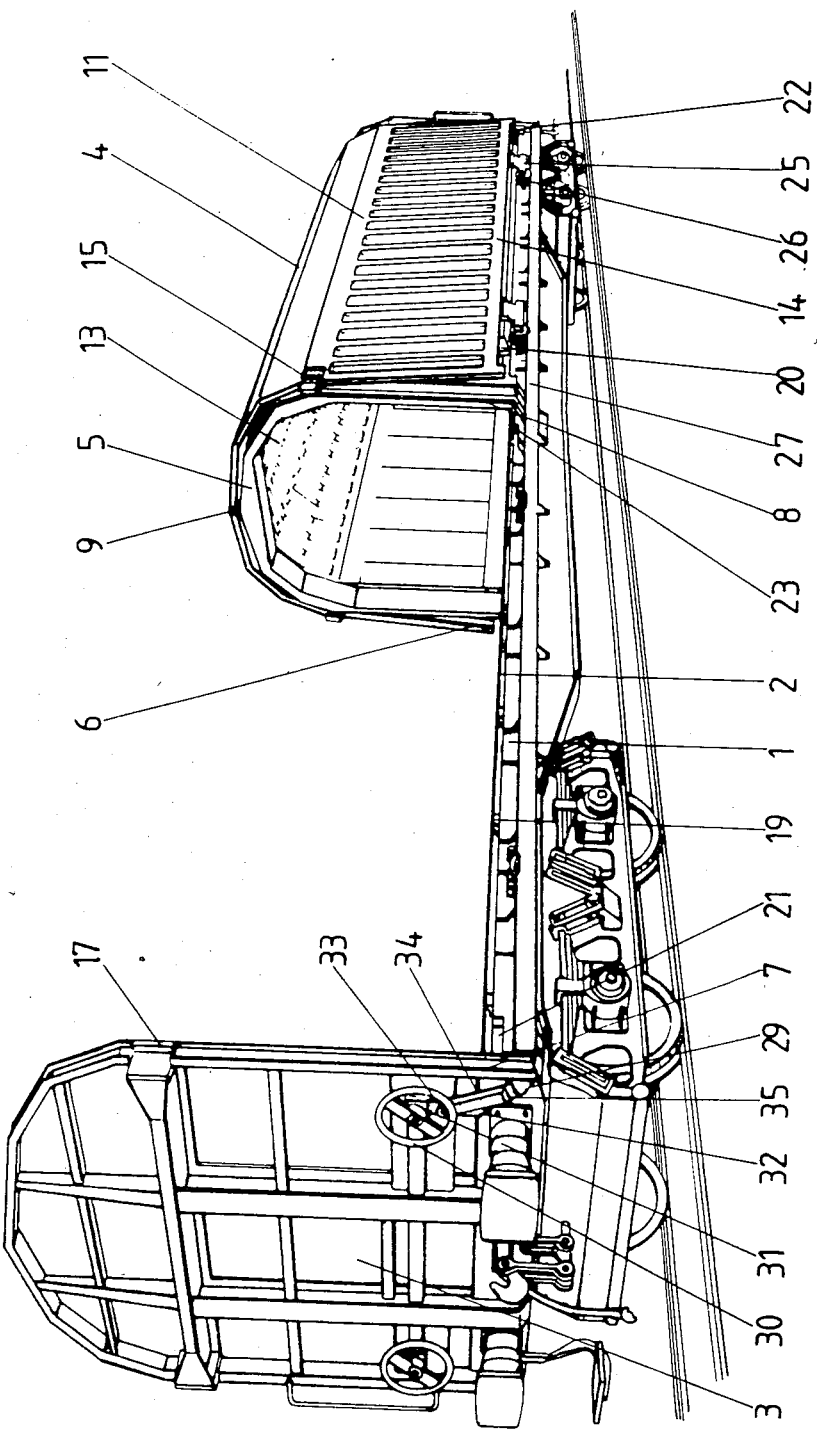
FIG. 1 is a perspective view of a freight car constructed according to the invention.
Figure 9:
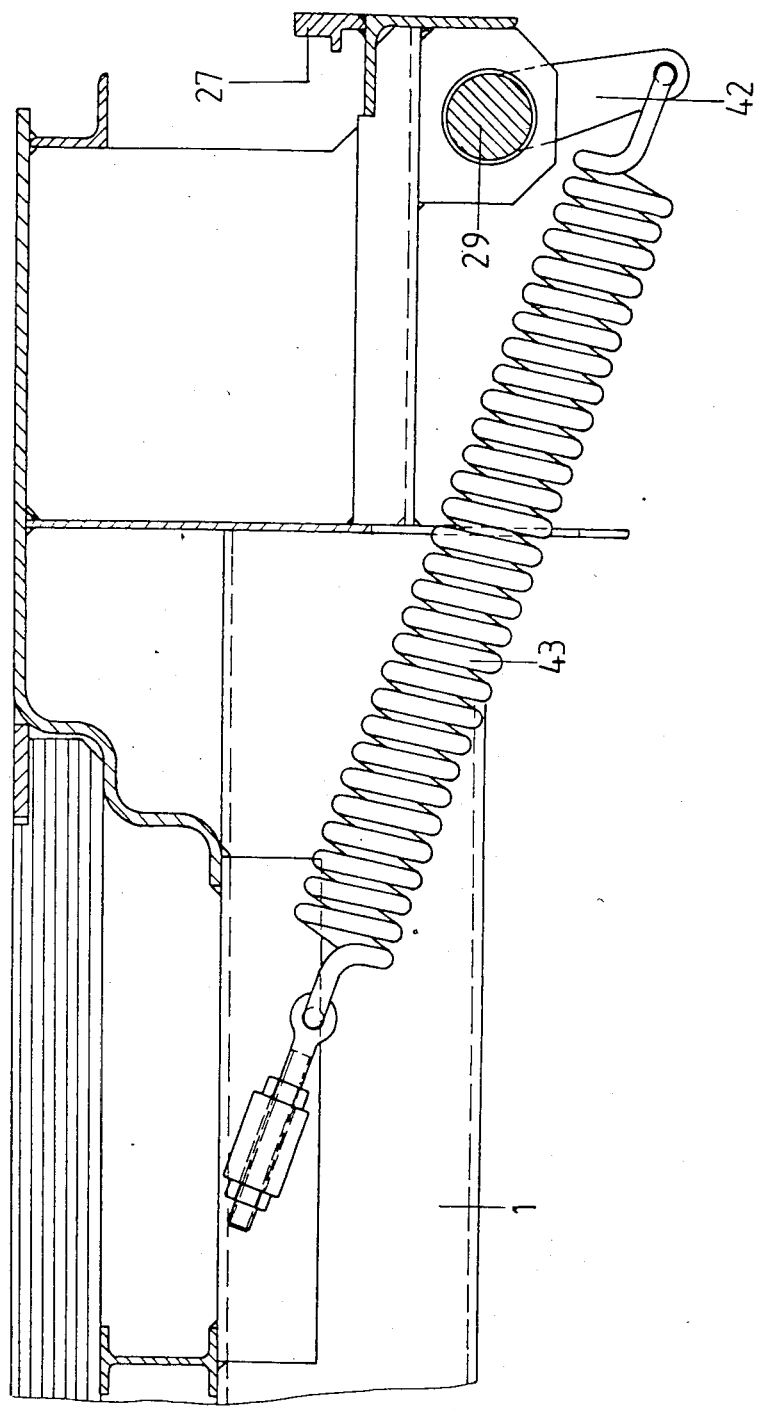
FIG. 9 is a partial transverse section through the underframe of the freight car according to FIG. 1 showing the relief spring.
Figure 10:
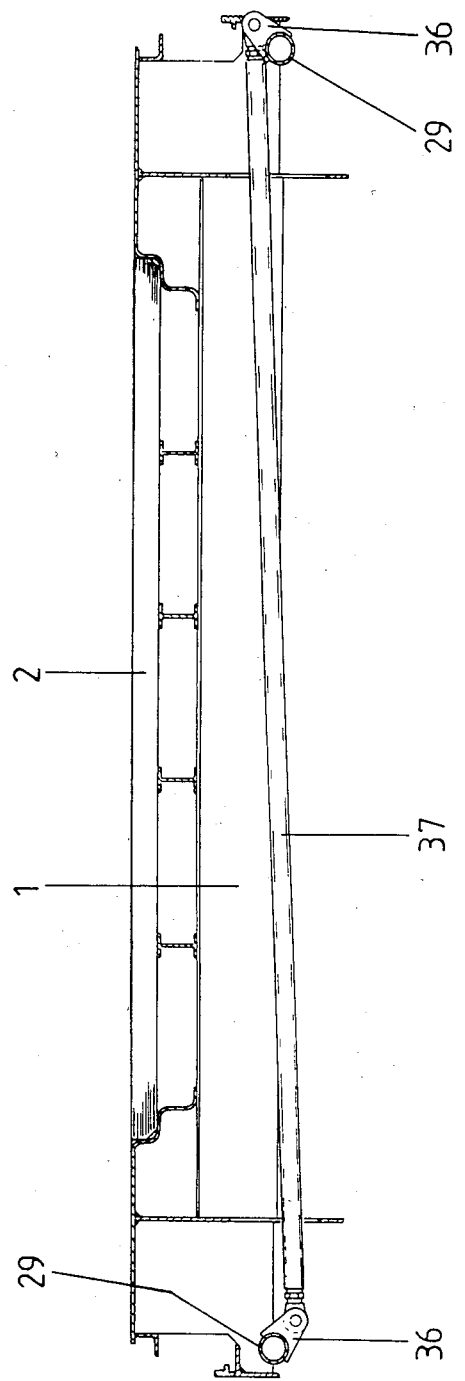
FIG. 10 is a transverse section through the underframe of the freight car according to FIG. 1.

Referring to the drawings in particular the invention embodied therein comprises a freight car having an undercarriage or underframe 1 including a flat cargo floor 2 and an upright fixed end wall 3 at each end of the floor 2. A gantry or arch structure 5 extends upwardly from the floor 2 substantially centrally between the end walls. A hood support rail 27 extends between the fixed end wall 3,3 on each side of the floor. In accordance with the invention, a space above the floor 2 is covered by a hood 4 which includes a roof portion made up of horizontally extending sections 13 which overlies the gantry 5 and one of the end walls 3 and it also includes side wall portions extending downwardly from each side of said roof portion made up of longitudinally extending girders 11 and which carry caster means 25 which is carried by the hood and is engageable with the rail 27 for facilitating the support of movement of the hood 4 along the complete length of the car.

The loading space of the freight car illustrated in the drawing is limited essentially by the floor 2 forming the top of the underframe 1, the head end walls 3 and the two hoods 4. In the center of the length of the car there is arranged on the underframe 1 a gantry 5 which spans the loading space and which is attached to the underframe 1 only at the bottom and has no struts along the car to the underframe 1 or to the end walls 3.

In a closed position, the hoods 4 abut with their end faces on metallic labyrinth packings 6 with longitudinal clearance in metallic labyrinth packings 7 of end wall 3 or respectively metallic labyrinth packings 8 of the center gantry 5.

In its cross section the hood 4 approximates the clearance profile of the freight car. At the top each hood 4 is divided lengthwise, the halves of each hood 4 being hinged together by hinges or bolt joints 9. The joint 9 of each hood 4 is completely covered with an elastic covering 10 which is tightly attached on each half of the hood 4.

At the level of the transition from the vertical region of hood 4 to the bent region thereof, on each side an end to end longitudinal girder 11 is arranged in hood 4, from which originate vertically upward and downward rib type staves 12 which are tied above and below in each half of the hood 4 to horizontal terminal sections 13, 14. At the end face each hood is limited by the metallic labyrinth packings 6. The covering of the hood 4 consists of sheetmetal or other suitable materials.

At the end face of each hood 4, at each girder 11, a hook shaped clamp 15 is arranged which, in the closed position of hood 4 and in the shifting position of hood 4 before its closing position, applies against elastic stops 16 of the end wall. In the closed position of hood 4, the clamp 15 embraces with play a hook 17 on the end wall 3 at the level of stop 16. At the terminal section 14 of hood 4 several downwardly extending support feet 18 are provided, which in the closed position of hood 4 rest on a short support rail 19 for each, which rails are fastened on the underframe 1. The support foot 18 of the hood 4 and support tail 19 of the underframe 1 are arranged in lengthwise direction of the car and are provided with matching bevels extending in lengthwise direction of the car, the bevels of support rail 19 being positioned, in the closed position of the hoods 4, externally with play before the bevels of the support feet 18.

Further there is arranged at the terminal section 14 of hood 4, near the end wall side lengthwise end thereof, an abutment piece 20 which, in the closed position of hood 4, stands with play before an abutment cam 21 fast to the underframe 1. Near the gantry side lengthwise end of hood 4, extending downward at the terminal section 14, at least one clasp 22 is fixed which in the closed position of hood 4 in the direction of the respective end wall stands with play before and under a liftoff lock cam 23 fast to underframe 1.

When the cargo presses against the inner side of an end wall 3 due to pressure caused by a runup impact of the freight car, it is elastically bent outwardly. Each hook 17 of the endwall applies against the clamp 15 of hood 4 and pulls the hood 4 in the direction of end wall 3. In this process the abutment pieces 20 of hood 4 place themselves against the abutment cams 21 of the underframe, bringing about a force locking connection of hood 4 with the underframe in lengthwise direction. The elastic flexing of the end wall is thereby inhibited.

After the impact the end wall 3 bends back again elastically and presses hood 4 over the abutments 16 and hook 15 back into its starting position. With the impact the hood 4 is lifted at its gantry side end face. At that, the clasps 22 of hood 4 place themselves against and under the liftoff lock cams 23 of the underframe 1 and thus prevent the lifting off of hood 4.

For the shifting of the hood there are fixed at each terminal section 14 near the lengthwise ends thereof casters 25, on the lengthwise ends of which a roller 26 is rotatably arranged. In the shifting position of the hoods 4 the rollers 26 stand on a rail 27 which is fast to the outside of the underframe 1. The rail 27 is straight and continuous uninterruptedly from endwall 3 to endwall 3. On each caster there is further provided a fixed short auxiliary rail 28 projecting over the caster, in lengthwise direction of the car. For pivoting out of its closed position, in which it rests in the support rails 19 of the underframe 1 via the support feet 18, each hood 4 is raised, expanded (spread), and pivoted outward about the bolt joint 9 in scissor fashion, with the rollers 26 setting down on the rails 27. This raising and pivoting of hood 4 occurs through actuating shafts 29 mounted rotatably in the underframe. For rotating the actuating shaft 29 of each hood at least one handwheel 30 is disposed at the respective end wall 3, which through a gear 31 rotates a vertical threaded spindle 32. On spindle 32 is mounted a nut 33, on which are hinged linkage rods 34 which are articulated at their other end to a lever 35 fast on the actuating shaft 29.

According to another embodiment of the invention, not shown, the rotating of the actuating shaft 29 can be effected by means of a hydraulic unit. It is also conceivable that the actuating shafts of both hoods are connected through a hydraulic unit operable from one end wall and thus both hoods can be raised and pivoted selectively from one end wall. Also, as shown in FIG. 1 of the drawing, it is possible to arrange a handwheel 30 on an end wall 3 near each long side of the car and to interconnect the handwheels 30 by means of a suitable connecting element nonrotationally.

The actuating shafts 29 of a hood 4 of each long side of the car are interconnected through levers 36 fast to the shafts and through connecting rods 37 articulated thereon, in such a way that turning the handwheel 30 causes rotation of the shafts 29 in opposite directions. For each caster 25 there is fixed on the actuating shaft 29 a support arm 38 which carries at its free end a support roll 39 roatable in lengthwise directions of the car. In the closed position of hood 4 and in shifting position of hood 4 before the closed position thereof, the support roller 39 applies with its fillet type tread against the auxiliary rail 28 from below. Upon rotation of the actuating shaft 29 in opening direction of hood 4, the support arm 38 raises via the support roll 39 and auxiliary rail 28 the caster 25 and with it the hood 4, pivoting the latter into shifting position. To prevent the auxiliary rail 28 from sliding off the support roller 39 as the actuating shaft 29 is being pivoted, safety forks 40 are arranged next to the support arm 38 which by their free, fork-shaped end embrace the auxiliary rail 28 and prevent the auxiliary rail 28 from sliding off the support roller 39.

Suitable known means, as for example flanges on the rollers 26 or guide rollers rotatable about vertical axes prevent the rollers 26 from sliding off rail 27 during shifting of hood 4. Further there are arranged as liftoff protection on the casters 25 clasps which engage in suitable recesses of rail 27 and secure hood 4 against lifting off during shifting.

To prevent bearing contact of the hood to be shifted during the opening operation at the top of the central gantry 5 or against the hood 4 in closed position, guide rollers 41 rotatable about vertical axes are arranged on the outside of each hood 4 and on the central gantry 5.

On at least on actuating shaft 29 of each hood an additional lever 42 is fixed, on the free end of which a relief spring 43 is arranged which is attached by its other end to the underframe 1. When hood 4 is pivoted from its shifting position to its closed position, the relief spring is tensioned by the dead weight of hood 4, thereby supporting the opening of hood 4.

In a freight car with end walls and shiftable hoods covering the loading space which are divided at the top, the hoods in closing position are to transmit to the underframe at least a part of the longitudinal forces acting on the end walls, and a hood actuating system is to ensure a selective shifting of the individual hoods one over the other. This is achieved in that in closed position each hood 4 is clamped at its end wall side longitudinal end form and force lockingly to the end wall 3 and stands on its lower lengthwise sides with abutment pieces 20 in the direction of the end wall 3 with play before abutment cams 21 on the frame of the underframe 1. Near its gantry side lengthwise end on its lower lengthwise side with clasps engage the hood in the direction of the end wall 3 with play before and under liftoff lock cams 23 of the underframe 1. The hood 4 stands in support rails 19 of the underframe 1, and the hood 4 is adapted by means of an actuating system 29 to 40 to be raised from its closed position with its rollers 26 on the rails 27 into the shifting position, and to be pivoted and set down.

While specific embodiments of the invention have been shown and described in detail to illustrate the application of the principles of the invention, it will be understood that the invention may be embodied otherwise without departing from such principles.

What is claimed is:

1. A freight car construction, comprising an undercarriage including a flat cargo floor, an upright fixed end wall on each end of said floor, a gantry extending upwardly from said floor between said end walls, a hood support rail extending between said fixed walls, a hood including a roof portion overlying said gantry and one of said end walls and a side wall portion extending downwardly from said roof portion, caster means carried by said hood and engageable with said rail for supporting said hood for movement along said rail, and a side support foot carried by each of said side walls having an outer surface which is bevelled, and a guide support rail on said undercarriage having an inwardly extending guide face which is beveled complimentary to the bevel of said support feet being located directly adjacent said support feet when said hood side wall is in a closed position.

2. A freight car construction, comprising an undercarriage including a flat cargo floor, an upright fixed end wall on each end of said floor, a gantry extending upwardly from said floor between said end walls, a hood support rail extending between said fixed walls, a hood including a roof portion overlying said gantry and one of said end walls and a side wall portion extending downwardly from said roof portion, caster means carried by said hood and engageable with said rail for supporting said hood for movement along said rail, said rail running along the total length of said undercarriage on each side thereof, each of said caster means comprising at least two separate casters with rollers mounted at spaced longitudinal locations on said hood and including actuator means carried by said undercarriage and engageable with said hood to lift said hood to move said side wall with said caster means off said rail and including a support roller, positionable below said caster means, said caster means including a short rail engageable on said support roller when said wall is in a closed position.

3. A freight car construction, comprising an undercarriage including a flat cargo floor, an upright fixed end wall on each end of said floor, a gantry extending upwardly from said floor between said end walls, a hood support rail extending between said fixed walls, a hood including a roof portion overlying said gantry and one of said end walls and a side wall portion extending downwardly from said roof portion, caster means carried by said hood and engageable with said rail for supporting said hood for movement along said rail, and actuator means carried by said undercarriage and engageable with said hood to lift said hood to move said side wall with said caster means off said rail and inwardly against the side of said floor to a position of said hood in a closed position, said actuator means including an actuator shaft rotatably mounted on said undercarriage and extending lengthwise of said undercarriage, said hood having a plurality of casters comprising said caster means each including a roller engaged on said rail, said actuating shaft having a fixed arm with a support roller rotatable in a lengthwise direction of the car which in a closed position of said hood applies from below against each caster, each caster including an auxiliary rail engaged against said roller, said actuating shaft being rotatable on said support arm and said support roller and said auxiliary rail.

4. A freight car according to claim 2, wherein said hood comprises at least two substantially horizontally extending terminal sections which are hinged together at a hinge connection substantially centrally over said gantry and one of said end walls.

5. A freight car according to claim 1, wherein said each support foot and each support guide rail are provided with matching bevels extending lengthwise of said car, the bevels being in closely spaced relationship.

6. A freight car according to claim 1, including elastic stop means connected to one end wall engageable with said hood in a closed position.

7. A freight car according to claim 3, including a safety fork forming a closed member extending over said auxiliary rail to hold it in position over said support roller.

8. A freight car ccording to claim 3, wherein said actuator means includes an actuating shaft for each hood, linkage means interconnecting said actuator shaft for each side of said car which brings about an opposite rotation of said actuating shafts on respective sides of said car.

* * * * *